United States Patent [19]

Périou

[11] Patent Number: 4,699,017
[45] Date of Patent: Oct. 13, 1987

[54] ELECTRIC MOTOR-SPEED REDUCER UNIT FOR DRIVING ACCESSORIES OF MOTOR VEHICLES, SUCH AS WINDOW GLASSES

[75] Inventor: Pierru Périou, Cergy, France

[73] Assignee: Compagnie Industrielle de Mecanismes en abrege C.I.M., France

[21] Appl. No.: 785,118

[22] Filed: Oct. 7, 1985

[30] Foreign Application Priority Data

Oct. 10, 1984 [FR] France ................................ 84 15564

[51] Int. Cl.$^4$ .......................... F16H 1/16; F16B 7/00; F16C 3/00
[52] U.S. Cl. ...................................... 74/425; 384/206; 403/26; 403/286; 403/298; 464/162; 464/182
[58] Field of Search ................. 74/89.14, 425; 403/26, 403/286, 298; 384/206, 276; 464/97, 156, 162, 182

[56] References Cited

U.S. PATENT DOCUMENTS

| 3,023,854 | 3/1962 | Lohr | 74/425 X |
|---|---|---|---|
| 3,635,100 | 1/1972 | Littmann | 74/425 X |
| 3,848,477 | 11/1974 | Giandinoto et al. | 74/425 |
| 3,990,013 | 11/1976 | Badger | 403/298 X |
| 4,046,030 | 9/1977 | Suzuki | 464/180 X |
| 4,411,637 | 10/1983 | Rauch | 464/180 |

FOREIGN PATENT DOCUMENTS 153507  1/1982  Fed. Rep. of Germany ........ 403/26

Primary Examiner—Allan D. Herrmann

[57] ABSTRACT

The unit comprises an armature (1) provided with a rotary output shaft (2) and a speed reducer (3) provided with a shaft (6) supporting a worm (5) engaged with a worm wheel (4) for driving the accessory, and an articulated coupling (20) between the two shafts (2, 6) which are disposed in end-to-end relation. The coupling (20) between the two shafts comprises a male member (8) disposed in female parts (9, 11) which are conjugate with the male member (8) and formed in confronting end portions (2a, 6a) of the two shafts (2, 6), and a single bushing (12) in which the end portions (2a, 6a) are inserted and which ensures the support and the axial alignment of the two shafts (2, 6).

9 Claims, 7 Drawing Figures

ELECTRIC MOTOR-SPEED REDUCER UNIT FOR DRIVING ACCESSORIES OF MOTOR VEHICLES, SUCH AS WINDOW GLASSES

The present invention relates to an electric motor-speed reducer unit for driving various accessories in motor vehicles, such as window glasses, openable roofs, etc.

This motor-speed reducer unit is of the type comprising an armature provided with a rotary output shaft and a speed reducer provided with a shaft carrying a worm engaged with a worm wheel for driving the accessory, a driving connection being provided between two shafts.

Various types of motor-speed reducer units employed for such applications are known:

1. In a first embodiment, the motor-speed reducer comprises an independent motor coupled to an independent speed reducer, the coupling between the output shaft of the armature and the shaft of the speed reducer being if desired a simple keying in the case of a perfect alignment, a universal joint or Oldham coupling, or a member of plastics material with or without clearance.

This motor-speed reducer unit requires four bearings, namely two bearings at the ends of each shaft, and has a large overall size and is expensive to manufacture.

2. In a second known embodiment, the armature shaft and the worm shaft of the speed reducer constitute a shaft in one piece supporting the armature and the worm which is a drive fit, or is keyed, on the shaft. This type of motor-speed reducer unit requires a worm whose diameter is sufficient to leave a reasonable thickness of material under its thread and this increases the overall size of the speed reducer.

3. In a third embodiment, the shaft and the worm are in one piece, the worm being cut into the shaft In the case where it is desired to obtain a worm of small diameter, usually less than or equal to 8 mm, the worm is machined in the shaft which has therefore at least the diameter of the worm, two or three bearings being provided as required. In the case where only two bearings are used, one of them is disposed at the end of the worm adjacent to the armature, and this bearing is very stressed by the radial component of the reaction of the worm wheel of the speed reducer, which reduces the efficiency of the apparatus. If, in order to reduce this drawback, a third bearing is employed supporting the opposite end of the worm, it is found that it is extremely difficult to correctly align this bearing with the other two bearings. The bearing is therefore mounted with a slight clearance in order to limit the deflection of the worm whose diameter at the root of the thread is small so that, in practice, the second bearing supporting the end of the worm which is the closest to the armature is just as stressed as in the case where only two bearings are employed, and this reduces the efficiency of the motor-speed reducer unit.

In the case of a worm having a large diameter machined in the material of the shaft, the use of two or three support bearings results in a still larger shaft diameter and in a corresponding greater reduction in the efficiency, owing to the fact that the friction forces are proportional to the diameter of the shaft. It can then be envisaged to reduce the diameter of the shaft by removing from the initial shaft the appropriate amount of material by machining, but this method results in a large loss of material and is consequently extremely expensive.

Another drawback of this type of embodiment resides in the difficulties of manufacturing the armature: the guiding of the shaft is difficult during the mounting of the armature plates, whence a possible bending of the shaft during this operation. It also becomes very difficult to place the commutator between the armature and the worm. Indeed, if the commutator is already mounted on the shaft between the worm and the place provided for the armature, it renders the guiding of the shaft still more difficult and moreover the tooling for mounting the sheets becomes delicate.

It is also possible to form a worm of large diameter in the material of the shaft by a cold deformation thereof after the shaft has been fitted into the armature sheets. However, the straightness of the shaft is difficult to achieve and, moreover, an additional delicate working station must be provided (rolling and then straightening) which must be rendered automatic in an automatic production line. Further, it is usual to place the commutator on the other side of the armature relative to the worm so as to avoid a spraying of the commutator by the fluid employed at the station for rolling and straightening the worm.

It should also be noted that these processes require usually the protection of the worm throughout the armature manufacturing procedure. Further, the worm is a hindrance if it is larger than the shaft. Lastly, the shafts obtained are very long and this results in considerable bending and out-of-balance, and consequenty vibrations and disturbing noises, these problems being in practice avoided in a satisfactory manner, in the case of the use of the bearings mentioned before, only with shafts of large diameter.

It is known to construct the worm and the shaft in a single piece by welding the worm to the end of the shaft, after the winding of the armature, by friction produced by, for example, rotation. However, this solution involves the use of heavy and therefore expensive means (welding station). This process moreover results in the manufacture of long shafts whose straightness is therefore difficult to ensure and this results in a large out-of-balance and an untrue running of the shaft which produces vibrations and noise. This then leads to an increase in the diameter of the shaft so as to reduce the bending and this results in greater losses due to friction in the bearings and increases the cost of the manufacture of the device.

An object of the invention is to overcome all these drawbacks and to provide a motor-speed reducer unit in which the driving connection between the armature shaft and the shaft carrying the worm is so arranged as to reduce out-of-balance and untrue running, which would result in disturbing vibrations and noise, without the use of excessively expensive means.

The motor-speed reducer unit according to the invention if of the type comprising an articulated coupling between the two shafts which are disposed in end-to-end relation.

According to the invention, the coupling between the shafts comprises a male element disposed in female parts conjugate with this male element formed in the facing ends of the two shafts, and a single bushing in which are inserted said ends and which provides the axial alignment and support of the shafts.

The shortening thus achieved for the armature shaft and the shaft of the worm consequently reduces the bending which produces out-of-balance and untrue running while the output shaft of the armature is devoid of radial reaction generated by the worm wheel of the speed reducer and to which the second shaft supporting the worm is subjected, which constitutes an important advantage over known arrangements. The diameters of the two shafts and their bearing surfaces may be reduced and consequently the losses due to friction and the weight of material may be reduced. Further, the diameter of the worm is independent of the armature shaft.

According to an embodiment of the invention, the male member is a key longitudinally splined whose splines fit in a complementary key axially formed in elements arranged in the end portions of the shafts and constituting the aforementioned female parts.

Furthers features and advantages of the invention will be apparent from the following description with reference to the accompanying drawings which illustrate several embodiments of the invention.

In the drawings:

FIGS. 5, 5A and 6 are longitudinal elevational and partial sectional views of two other embodiments of the coupling provided by the invention.

Figure 1:
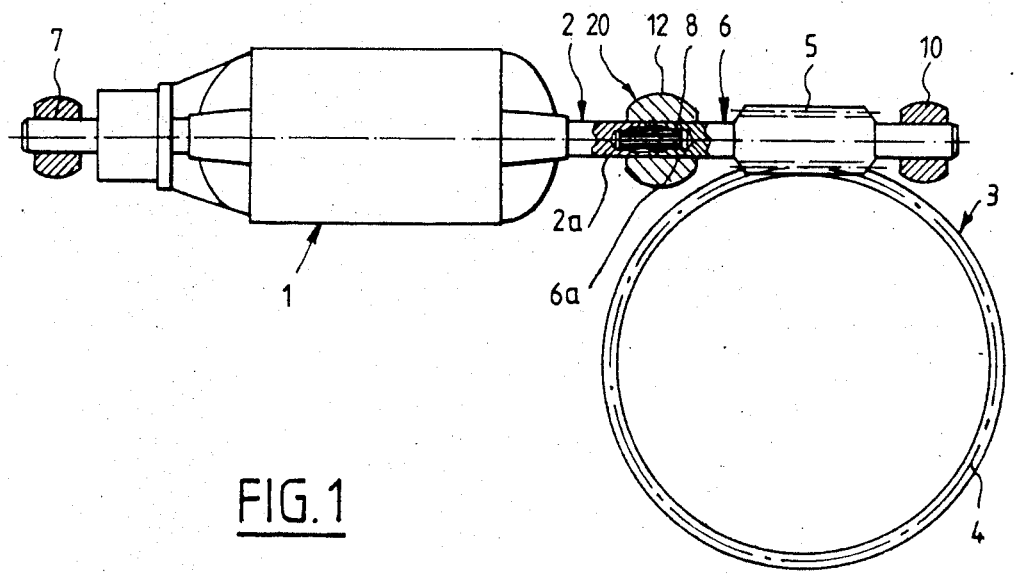
FIG. 1 is a simplified longitudinal half-sectional, half-elevational view of an electric motor-speed reducer unit according to a first embodiment of the invention.

The electric motor-speed reducer unit illustrated in the drawings is adapted to drive accessories of motor vehicles, such as window glasses, openable roofs, windscreen-wipers and more generally comprises a motor and a speed reducer having a worm and a tangent worm wheel.

This motor-speed reducer unit comprises an armature 1 provided with a rotary output shaft 2, and a speed reducer 3 formed by a worm wheel 4 and a worm 5 connected to a support shaft 6, two bearings or bushings 7, 10 being provided on opposed end portions 2a, 6a of the shafts 2 and 6 for supporting the latter. The worm wheel 4 is connected to the accessory to be actuated by known means (not shown).

The end portions 2a, 6a of the shafts, 2, 6 in end-to-end relation are connected to rotate together by an articulated coupling 20 to which the invention more particularly relates.

The coupling 20 comprises a male member 8 disposed in female parts 9, 11 (FIG. 2) formed in the facing end portions 2a, 6a of the shafts 2, 6, and a single bushing 12 in which are inserted said end portions 2a, 6a and which ensures the supporting and the axial alignment of the shafts 2 and 6. The male member 8 is, in the presently-described embodiment, a key or pin longitudinally splined, the splines 13 of which are imbricated in complementary teeth axially formed in the female parts 9, 11. Each feamle part or form 9, 11 comprises, in starting at the end surface of the shafts 2a, 6, a smooth cylindrical recess 9a, 11a whose section is substantially greater than the key 8, and freely mounted on the latter with normal tolerances. This difference in the section of the member 8 and the recesses 9a, 11a is greatly exaggerated in FIG. 2 in order to facilitate an understanding of the technical effects obtained by this coupling. This cylindrical recess 9a, 11a is followed by a female form 9b, 11b having a diameter substantially less than that of the recess 9a, 11a and whose wall has teeth which correspond to the splines 13 so as to achieve the transmission to the shaft 6, through these teeth, of the torque of the armature shaft 2. Thus, the section of the female form 9b, 11b has a star shape having eight branches 17 defining as many ribs and grooves conjugate with the splines 13. The grooved female form 9b, 11b is extended by a conical end 9c, 11c, these successive cavities having a common axis X—X which coincides with the common axis Y—Y of the shafts 2 and 6 (FIG. 2) apart from the tolerances.

The sections of the toothed forms 9b, 11b and of the key 8 are so arranged that the interface between the male and female surfaces in mutual bearing relation, bearing in mind a possible defect in the alignment between the shafts 2, 6, has a maximum section while allowing sufficient disalignment or an articulation between the two shafts 2 and 6. The key 8 is thus freely mounted in its cavities 9, 11 owing to the recesses 9a, 11a, whose length is sufficient to permit this free mounting.

Figure 4:
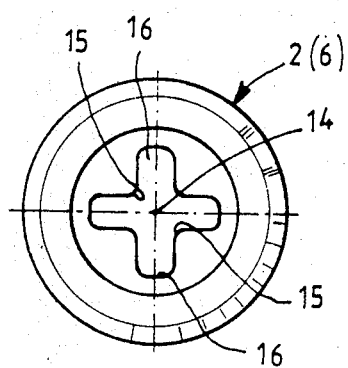
FIG. 4 is a view similar to FIG. 3 of a modification of the cavities of the male member.

By way of a modification, FIG. 4 shows a form or cavity 14 having a cross-shaped section and therefore has four ribs 15 separated by gaps having an angular extent of 90° and defining therebetween grooves 16, this section being engaged with a conjugate cross-shaped section of the key of the coupling.

Figure 3:
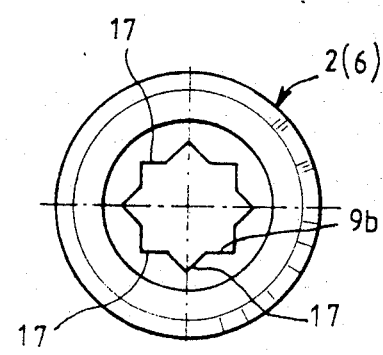
FIG. 3 is an end elevational view of one of the shafts of the coupling shown in FIG. 2.

It must be understood that the sectional shapes of the female forms illustrated in FIGS. 3 and 4 are given merely by way of example, since different sections may be employed. However, the cross-shaped section and star-shape section are preferred owing to the fact that they ensure the maximum mutual engagement between the male and female surfaces when taking into account the disalignment between the female form and the key of the coupling.

Figures 5, 6:
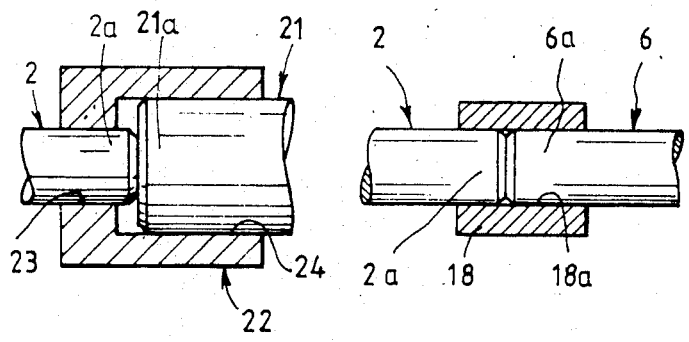

The single bearing or bushing for supporting the end portions 2a, 6a of the shafts 2, 6 may be spherical as the bushing 12 or formed by a cylindrical ring 18 (FIG. 5).

In the modification shown in FIG. 6, the shaft 21 of the worm has a diameter larger than that of the shaft 2 and the bushing 22, whose outer surface is cylindrical but may be spherical, is provided with two concentric bores 23, 24 whose diameters correspond to those of the end portions 2a, 21a, of the shafts 2, 21.

In each case, the end portion 6a, 21a of the shaft 6, 21 is inserted in the bushing 12, 18, 22 on the major part of the axial length of the latter. The division of the length of the bushing between the two shafts is determined in accordance with the load that each shaft exerts on the bushing. Further, the shafts 6, 21 of the worm, which is the most loaded, must also extend into the bushing to the extent of more than one half of its length, so as to avoid pivoting on itself under the effect of the reaction of the worm.

Figure 2:
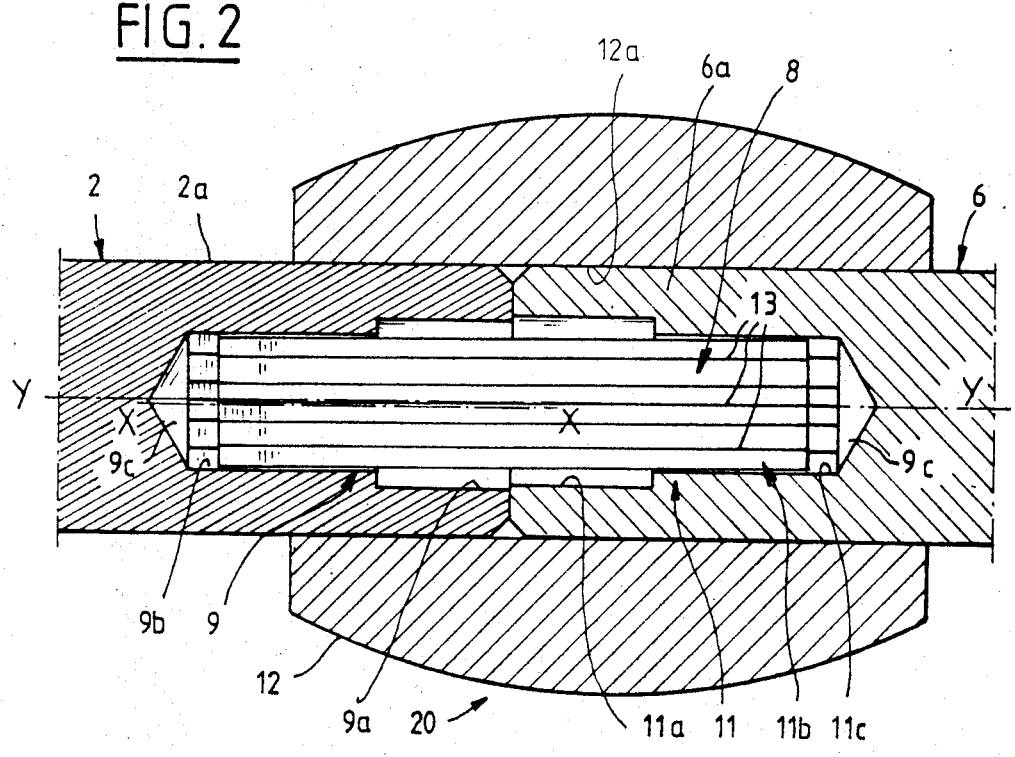
FIG. 2 is a partial axial sectional view of an enlarged scale of the coupling between the two shafts shown in FIG. 1.

In addition to the aforementioned advantages, the coupling according to the invention has the following advantages:

there is created a line of shafts 2, 6 having, owing to the articulated coupling 20, a butt-joint which allows a slight angular deviation of the two shafts; indeed, such an angular deviation is allowed by the section of the cylindrical recesses 9a, which exceeds the section of the key 8 and by the sufficient length of these recesses 9a, for example one third or one half of the total length of the cavities 9, 11;

the worm 5 has a diameter independent of the diameter of the armature shaft 2, which latter is considerably shortened relative to shafts in a single piece of the aforementioned prior embodiments, which reduces the bending and lack of balance which would produce vibrations;

each shaft 2 and 6 is supported by two bearings, namely respectively 7, 12, and 12, 10, consequently without any overhang between the two shafts, the radial reaction of the worm wheel 4 on the worm 5 being moreover withstood solely by the shaft 6 and by the bearing 12 (18) and not by the shaft 2; this result is facilitated by the fact that the bearing 12 or 18 is in contact on the major part of its length with the end portion 6a of the shaft 6, as can be seen in FIGS. 2 and 5;

the support bearing 12 (18) has a single bore 12a, 18a receiving the end portions 2a, 6a which have the same diameter, which guarantees the concentricity of the shafts 2, 6 together with the fact that these shafts are supported in this region by a single bearing;

a slight disalignment of the three bearings 7a, 12, 10 may be tolerated within the limit of the clearances allowed by the normal fittings between the component parts of the junction; further, the fact that two end portions 2a, 6a of the shafts 2, 6 are in contact, ensures the retransmission to the end of the armature 1 of the axial component of the force exerted by the worm wheel 4 on the worm 5 and thus permits the use of conventional axial abutments in the form of pellets of, for example, polyamide. Further, there may advangeously be interposed between the end portions 2a and 6a by way of a modification (FIG. 5a) a member m of plastics material which is coaxial with the key, for example of polyamide, transmitting the axial force from the shaft 6 to the shaft 2; this shock-absorbing member has a hardness less than that of the shafts, avoids a possible burring of their ends and thus guarantees the life of the device notwithstanding repeated shocks in the course of a long duration of operation;

it should be noted that the disalignment of the bearing 7 of the armature opposed to the worm 5 does not change the distance between the axis of the wheel 4 and the worm 5 which is defined only by the position of the two bearings 12, 10 of the worm 5, these two bearings being carried by the same member 6.

What is claimed is:

1. An electric motor-speed reducer unit for driving accessories of motor vehicles, such as window glasses, said unit comprising an armature havin a rotary output shaft, a speed reducer having a shaft, a worm carried by the shaft of the speed reducer, a worm wheel engaged with the worm for driving the accessory, and an articulated coupling between the two shafts which shafts are disposed in end-to-end relation, the coupling comprising female parts which are disposed in confronting end portions of the two shafts, a male member disposed in the female parts and conjugate with the female parts and a single bushing in which said end portions are inserted and which ensures the support and the axial alignment of the two shafts which are in contact by ends thereof, so as to transmit to the shaft of the armature an axial component of a force exerted by the worm wheel on the worm.

2. A motor-speed reducer unit according to claim 1, wherein the male member is a key in the confronting end portions which is longitudinally splined, and teeth which are complementary to the splines and are formed axially in forms arranged in the end portions of the shafts and constituting said female parts, the splines of the key being imbricated in said teeth.

3. A motor-speed reducer unit according to claim 2, wherein each shaft confronting end portion comprises, starting at an end of the shaft, a smooth cylindrical recess whose section is substantially larger than the section of the key and freely mounted on the latter with normal tolerances, and a form having a wall defining the teeth conjugate with the splines of the key so as to transmit the torque of the armature shaft to the shaft of the worm.

4. A motor-speed reducer unit according to claim 3, wherein the sections of the toothed cylindrical forms and of the key near the confronting end portions are so determined that the interface between the male and female surfaces which are in fact in mutual engagement, taking into account a possible disalignment between the shafts, has a maximum section while allowing a disalignment or a sufficient articulation between the two shafts.

5. A motor-speed reducer unit according to claim 4, wherein the sections of the key and of the conjugate toothed female forms near the confronting end portions are in the shape of a cross.

6. A motor-speed reducer unit according to claim 4, wherein the sections of the key and of the conjugate toothed female forms near the confronting end portions are in the shape of a star.

7. A motor-speed reducer unit according to claim 1, wherein the bushing is spherical and the confronting end portion of the shaft of the worm is inserted in the bushing in a major part of the axial length of the bushing.

8. A motor-speed reducer unit according to claim 1, wherein the bushing is a cylindrical ring and the confronting end portion of the shaft of the worm is inserted in the bushing in a major part of the axial length of the bushing.

9. The motor-speed reducer unit according to claim 1 further comprising a shock-absorbing member interposed between confronting end portions of the shafts.

* * * * *